United States Patent [19]

Ben-Dor

[11] 4,350,207
[45] Sep. 21, 1982

[54] AGRICULTURAL IMPLEMENT FOR THE EXTRACTION AND SHREDDING OF STALKS AND ROOTS

[76] Inventor: Yaron Ben-Dor, No. 7 Ruth St., Haifa, Israel, 34404

[21] Appl. No.: 232,355

[22] Filed: Feb. 6, 1981

[30] Foreign Application Priority Data

Aug. 28, 1980 [IL] Israel .................................. 61123

[51] Int. Cl.$^3$ ............................................. A01D 13/00
[52] U.S. Cl. ........................................ 171/58; 56/14.3
[58] Field of Search .................... 56/14.3, 14.4, 14.5, 56/500–505; 171/58, 59, 60

[56] References Cited

U.S. PATENT DOCUMENTS

| | | | |
|---|---|---|---|
| 2,940,528 | 6/1960 | Magnuson | 171/58 |
| 3,437,152 | 4/1969 | Barrentine | 171/58 |
| 3,599,404 | 8/1971 | Fernandez et al. | 56/14.3 |
| 3,940,913 | 3/1976 | Wallenfang et al. | 56/14.5 |
| 4,236,369 | 12/1980 | DeCoele | 56/14.5 |

*Primary Examiner*—Robert A. Hafer
*Attorney, Agent, or Firm*—Schwartz, Jeffery, Schwaab, Mack, Blumenthal & Koch

[57] ABSTRACT

A tractor-drawn agricultural implement serving to extract and to shred stalks and roots from a reaped cotton field, comprises a frame mounted on two wheels, on which are mounted a shredder and a blower unit. The shredder is completely enclosed in a casing which is provided with a stalk inlet opening and with an outlet opening connected to the suction side of the blower unit. Two arms are pivotally connected to the frame above the shredder inlet, each arm being provided at its lower end with two obliquely positioned, hydraulically rotated extractor wheels fitted with resilient tires which have their adjoining surfaces pressed together and pull the stalks out of the ground while passing thereover. The implement is characterized by the conveying means serving to grip the extracted stalks and to insert them into the shredder casing. This means consists of two belts, each running over a bottom pulley rotating together with the respective extractor wheel and over a top pulley mounted at the upper end of the arm, the inner stretches of the two belts being pressed together by two rows of tension pulleys. The stalks are transported to the top between the belts and are released into the gap between a pair of horizontal feed rollers common to both arms and serving to deliver the stalks into the shredder casing through a second pair of feed rollers. The rollers are provided on their outside with ribs and/or teeth so as to firmly grip and transport the plants.

8 Claims, 7 Drawing Figures

AGRICULTURAL IMPLEMENT FOR THE EXTRACTION AND SHREDDING OF STALKS AND ROOTS

BACKGROUND OF THE INVENTION

1. Field of the Invention

The invention relates to a tractor-drawn agricultural implement adapted to extract and shred stalks and roots of plants growing in parallel rows, more particularly cotton plants.

In order to prepare the soil, after harvesting, for the new sowing season it is necessary to extract the remaining stalks and roots which are either left on the ground for subsequent gathering, or are shredded into small particles and dispersed over the field as fertilizer. Different kinds of equipment are being used for this purpose, the implements being generally adapted for attachment to an agricultural tractor, both for the purpose of trailing them across the field to be cleaned, and of obtaining the power necessary for extracting and/or shredding the plants. These machines which, in addition to extracting, also shred the stalks have the main drawback that shredding is done rather roughly and irregularly into smaller and larger particles, for the reason that—in the existing machines—the material is not properly fed into the shredding device and that the cuts are, therefor, of a random nature.

2. Objects and Summary of the Invention

Since a market exists for finely comminuted plant material, especially cotton plants, as chickenfeed or as fertilizer, it is the foremost object of the present invention to provide an implement that will extract the roots and stalks and finely comminute them into particles of more or less uniform size. It is a further object of the invention to provide means for gathering the particles in suitable container means for storage and/or transport to other destinations.

The stalk extracting and shredding equipment, in accordance with the invention, utilizes a known extraction method by means of several pairs of obliquely mounted wheels with wide tires which are pressed together and driven in opposite sense of rotation. While equipment travels over and along parallel rows of plants, each plant is gripped between one pair of tires and pulled out of the ground. Whereas in the known kind of equipment the extracted material is left to rot on the ground, or to be gathered by other equipment, the present implement is provided with conveying means which are to grip the stalk immediately after its emergence from between the pair of tires and to feed it into a shredding device adapted to cut it up into small particles. The shredding device is enclosed and attached to the suction opening of a centrifugal blower which will gather the particles and convey them to a closed container or, alternatively, blow and distribute them across the cleared field.

A stalk-extracting and shredding implement, according to the invention, comprises a vehicle frame mounted on wheels and provided with means for attaching it to the rear of an agricultural tractor; the frame carries in its rear portion a blower unit and a rotary shredder of known design, both being driven from the power-take-off of the tractor, and a casing totally enclosing the rotary shredder except for a plant inlet opening and an outlet opening connected to the blower unit. Two arms are pivotally connected to the top of the implement frame above the rotary shredder and extend in oblique downward direction towards the tractor rear, each arm carrying at its lower end two obliquely positioned extractor wheels of known design which are provided with resilient tires having their adjoining surfaces pressed together and are mounted on parallel shafts rotatingly fastened to the arm and driven by hydraulic motors. The implement is characterized by the provision of conveying means, serving to convey the extracted plants from between the tired extractor wheels to the rotary shredder, which comprise a belt conveyor mounted on each of the pivoted arms and consisting of two parallel belt drives having their respective upwardly moving stretches pressed together over a length extending from the extractor wheels to the top of the pivoted arm. The conveying means further comprise two superposed pairs of horizontal feed rollers, positioned in the space between the upper outlets from both belt conveyors and the opening in the casing enclosing the rotary shredder, the sense of rotation of the feed rollers being so directed as to convey extracted plants from the two belt conveyors into the shredder through the opening in the casing.

The belt conveyor on each arm comprises two belts of different lengths lying in a common plane, the shorter of the two belts being proximate to the interveing space between the two arms, each belt is tensioned between a lower driving pulley mounted on the rotatable shaft of the respective extractor wheel and an upper, loose pulley mounted in the upper arm portion, whereby the loose pulley of the longer belt, or the second upper pulley, is positioned at a greater distance from the driving pulley, or the second lower pulley, than that of the shorter belt. The upwardly moving stretches of the belts are urged into close contact by two sets of tension pulleys positioned along these stretches.

In a preferred embodiment of the belt conveyor the loose pulley, or the second upper pulley, of the longer belt is positioned close to the loose pulley, or the first upper of the shorter belt substantially in the axis of the shorter belt drive, which results in delivery of the extracted plants clamped between the contacting belt portions, towards the gap between the arms into the feed roller means. In another embodiment of the belt conveyor the loose pulley of the shorter belt drive is rigidly attached to a rotatable shaft, and coaxially with this pulley a sprocket wheel is similarly attached to this shaft, adapted to be rotated together with the loose pulley. About a quarter of the circumference of the sprocket wheel is enclosed by a curved guide extending from the point where the contact between the two belt ends to a point above the feed roller means.

The feed roller means comprise two pairs of parallel rollers in close proximity driven in opposite sense of rotation, so positioned that their vector of movement of their contacting surface—and accordingly the conveyed stalks—is substantially perpendicular to, and away from, the plane of said flexible belts. The feed rollers comprise an upper pair of parallel rollers the center portions of which are provided with spikes, while the two lateral portions of at least one of said rollers are provided with helical ribs protruding out of the roller surface and surrounding the roller in opposite sense of direction for each lateral portion. Underneath the upper pair of rollers is a second pair symmetrically positioned thereto, which comprises one roller having a spiked surface and one roller having a smooth surface, similarly driven in opposite sense of rotation; the second pair of rollers is positioned close to said rotating shredder.

The shredder, as known to the art, consists of a fast-rotating shaft having a plurality of radial cutter arms pivotally attached to its circumference; each arm is provided at its end with a cutter blade which moves parallel to the shaft axis, and corresponding to the cutter blades at least one stationary cutter blade is positioned in the space between the second pair of rollers and the said movable cutter blades. The shredder is enclosed in a casing which is connected to the suction port of a centrifugal blower.

The equipment operates as follows: each stalk extracted is gripped between the contacting belt stretches and brought to the top of the vehicle frame where it is relinquished and gripped by the two rollers of the upper pair; since the plants enter the gap between the rollers from the two belt conveyors from the two roller ends, they are brought to the central portion by means of the helical ribs and are fed in downward direction into the lower pair of rollers, which feed them straight into the shredder. The shredder comminutes each stalk into small particles which are sucked out of the shredder casing by the said centrifugal blower and delivered into an attached wheeled container. Alternatively the blower may be provided with a rearward directed outlet spout through which the particles are blown into the open and distributed over the area.

BRIEF DESCRIPTION OF THE DRAWINGS

In the accompanying drawings which illustrate, by way of example, one embodiment of the invention.

DETAILED DESCRIPTION OF THE DRAWINGS AND PREFERRED EMBODIMENTS

Figure 1:
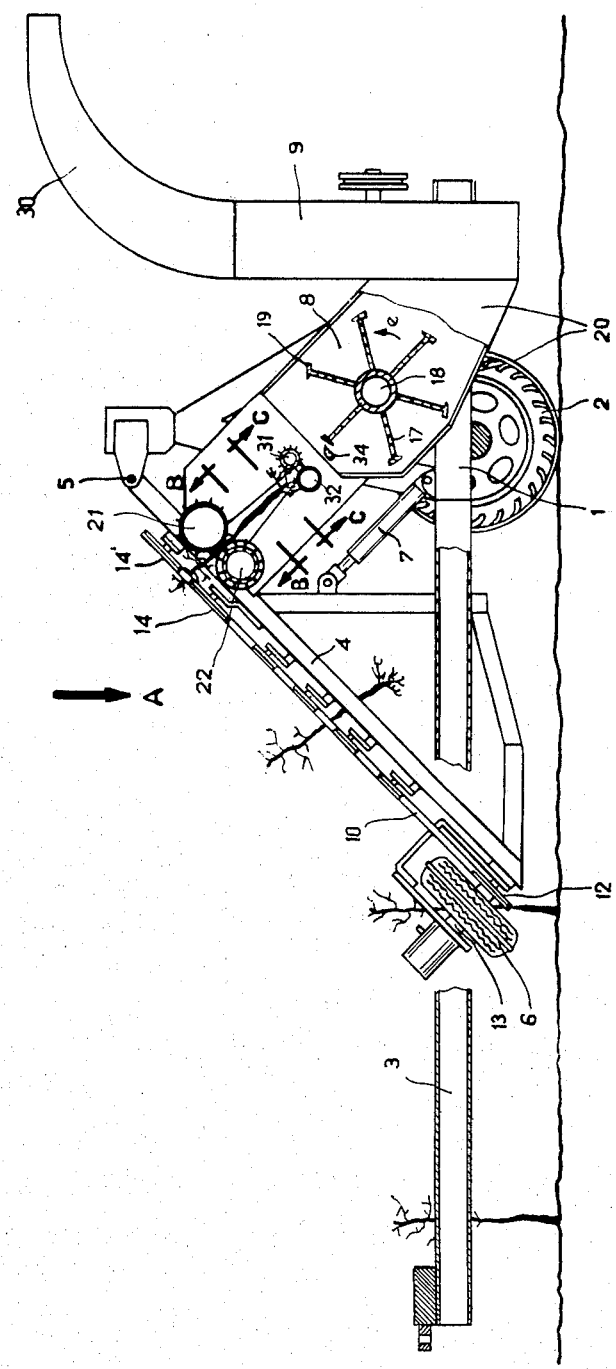
FIG. 1 is part side view and part vertical section of a stalk-extracting and shredding implement.
Figure 2:
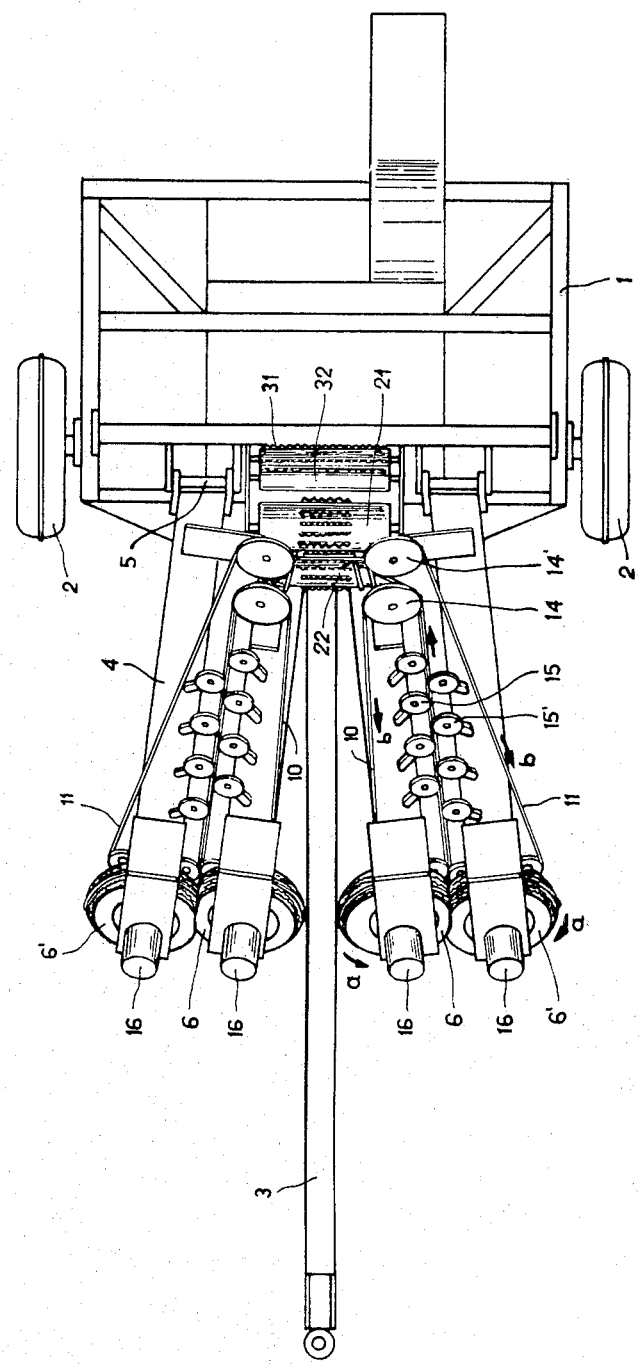
FIG. 2 is a plan view of the implement, in the direction of arrow A of FIG. 1.

Referring now to FIGS. 1 and 2 of the drawings, the different working components are mounted on a vehicle frame 1 which is carried on two wheels 2 and connected to a traction vehicle by a two-bar 3. From the top of the vehicle frame two parallel swinging arms 4 extend in sloping downward direction and are connected to the frame by pivots 5. Each arm 4 carries a pair of tired wheels 6 and 6' and a belt conveyor as well as the drive for both the wheels and the belts. The height of the tired wheels 6, 6' above the soil surface can be adjusted by changing the angle of the arms 4 in relation to the frame 1 by means of hydraulic jacks 7. The vehicle frame carries a shredder wheel 8 and two pairs of feeder rollers, the details of which are visible in FIGS. 3 and 4. The last described rotating equipment is preferably driven by means of shafts and belt drives connected to the power-take-off of the traction vehicle through a drive shaft, all of which are, however, not shown in the drawings as obvious to a person skilled in the art. Two tired wheels 6 and 6' are mounted on the lower end of each arm 4 at a distance which causes a slight deformation and compression of the tires in the contact area. The wheels are mounted on shafts 13 which are positioned with their axes at right angles to the arm and are driven by hydraulic motors or actuators 16 rotating in the direction of the arrows a.

Figure 3:
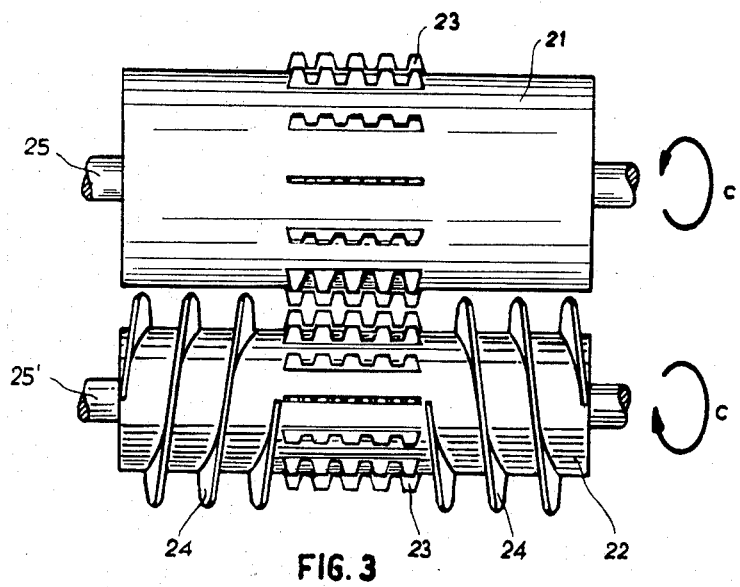
FIG. 3 is a section along B—B of FIG. 1.
Figure 4:
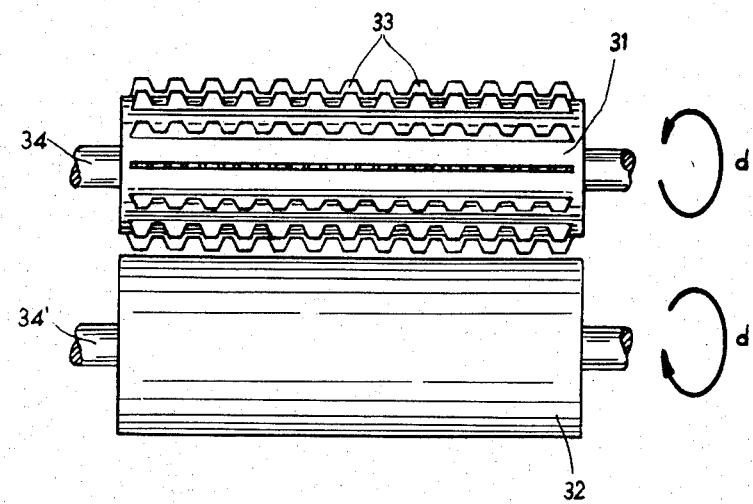
FIG. 4 is a section along C—C of FIG. 1.

The belt conveyor mounted on each of the arms comprises two belts 10 and 11 which extend along the upper surface of the arm. The belts are tensioned between two lower drive pulleys 12 mounted on the shafts 13 and two uper loose pulleys 14 and 14' near the top of the arm 4. The belts move in the direction of the arrows b, the respective upward-directed stretches of the two belts being in close contact, compressed by two rows of tension pulleys 15, 15'. The two loose pulleys are positioned at different height on the arm 4, second upper pulley 14' above first upper pulley 14 in close relationship thereto, whereby the delivery end of the belts on one arm is turned towards the delivery end of the belts on the other arm. As can be discerned from FIG. 1, the belts grip the plants and carry them upwards and, at the delivery end, guide them sideways between the two rollers of the upper pair. As illustrated in FIG. 3, the two rollers 21 and 22 are provided in their central portions with parallel rows of spikes or teeth 23, and the roller 22 is, in addition, provided with helically protruding ribs 24 along both lateral portions of roller 22. The rollers are mounted on horizontal parallel shafts 25, 25' (shown in broken-off state) which are driven in opposite sense of rotation as indicated by arrows c. The plants inserted from both sides into the gap between the rollers are gripped by the helical ribs 24 and conveyed to the central, spiked portion, which conveys them downwards into the gap between the two lower rollers 31, 32. Of the two, the roller 32 has a smooth outer surface, while the roller 31 is provided with parallel rows of spikes or teeth 33. Both rollers are mounted on parallel horizontal shafts 34, 34' which are driven in opposite sense of rotation (arrows d) so as to pull the stalks towards and into the shredder 8. The shredder shaft 18 is rotated at high speed in the direction of the arrow e and the cutters 19 fastened to the ends of the pivots arms 17 cut through the stalks inserted by the lower rollers 31, 32. A stationary cutter blade 34 is fastened parallel to the shredder shaft, just outside of the cylindrical surface described by the cutters, this blade serving to retain the stalks and to cause a double cutting action. The shredder wheel is almost entirely enclosed in a casing 20 which is open towards the suction inlet of the blower 9. The shredded particles are sucked up by the blower 9. The shredded particles are sucked up by the blower and delivered through a spout 30, either into the atmosphere or into a closed storage container, wheeled behind the vehicle.

The aforegoing description refers to an implement with two parallel arms and extracting units, but it will be understood that larger units may be provided with four or even six arms and extracting units, serving to extract four to six rows of stalks and roots simultaneously.

Figure 5:
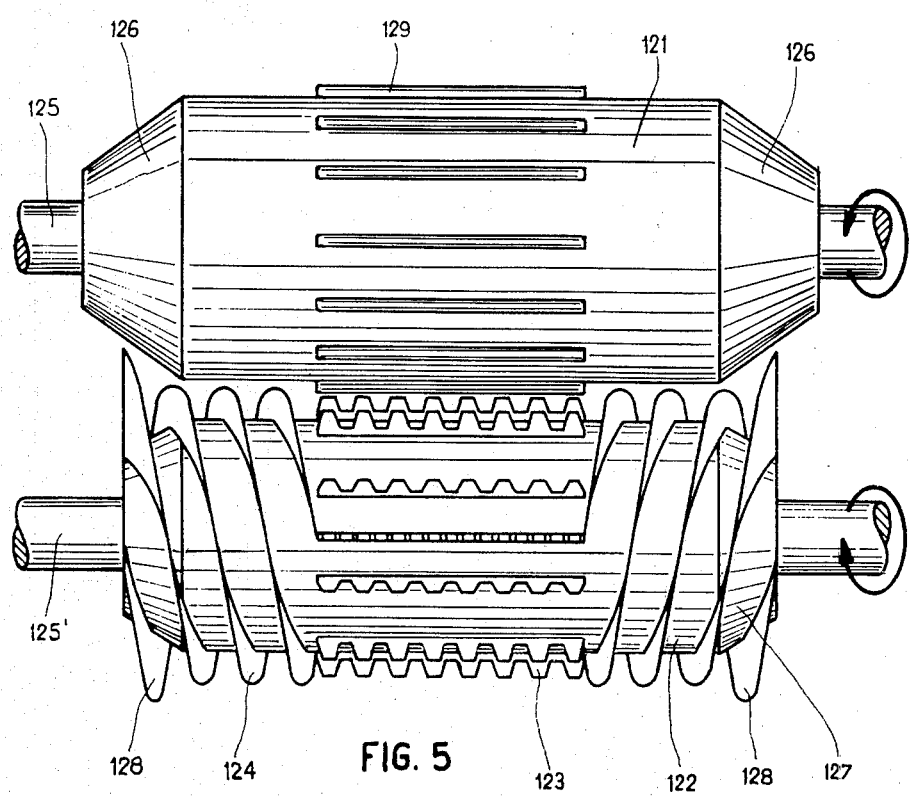
FIG. 5 illustrates a modification of the two feed rollers of FIG. 3.

The upper pair of rollers illustrated in FIG. 5 are similar to those shown in FIG. 3, but differ from these in a few details: The two roller ends are tapered so as to form cone frustums 126 and 127 respectively. The roller 122 is provided with parallel rows of teeth or spikes 123 and with helically protruding ribs 124, similar to those shown in FIG. 3, however the two extreme ribs 128 are of larger diameter so as to extend into proximity of the tapered ends 126 of the roller 121. The roller 121 is distinguished from the roller 21 of FIG. 3 by that, instead of rows of teeth 23, it is provided with parallel ridges 129, created by welding round bars onto the roller surface.

Figure 6:
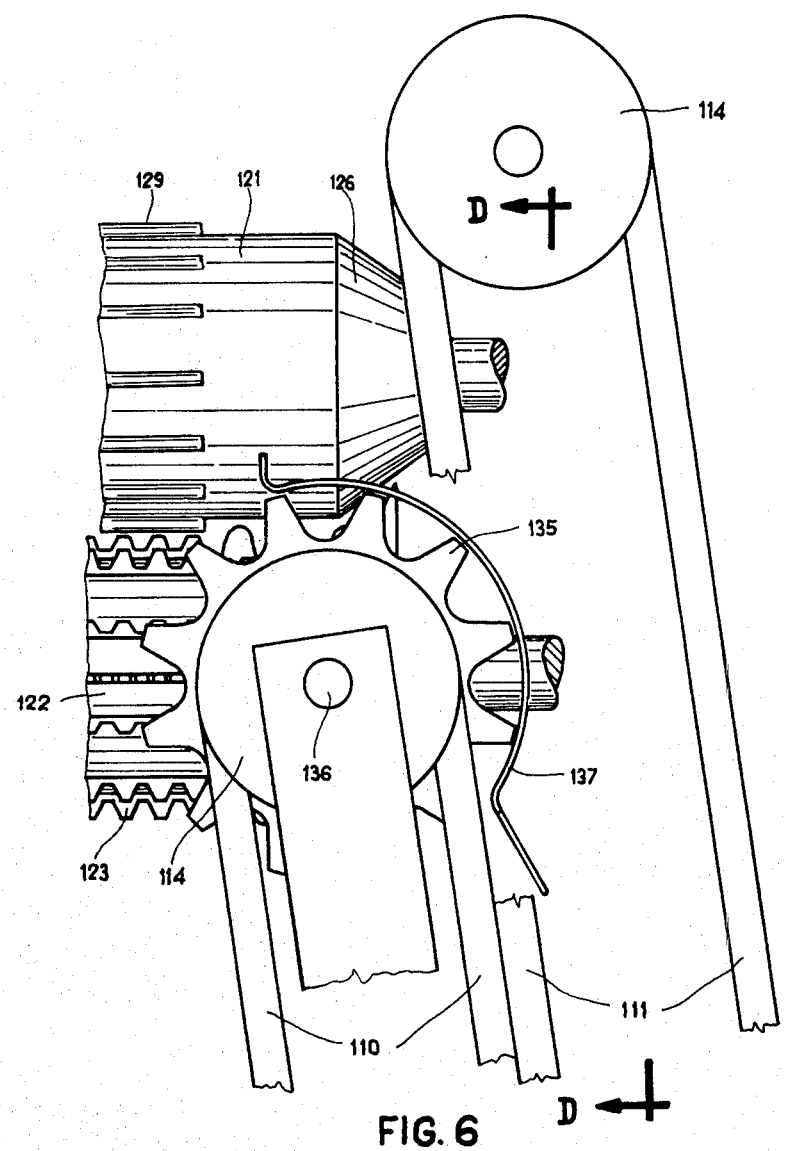
FIG. 6 illustrates a modified embodiment of the upper end of the belt conveyor.
Figure 7:
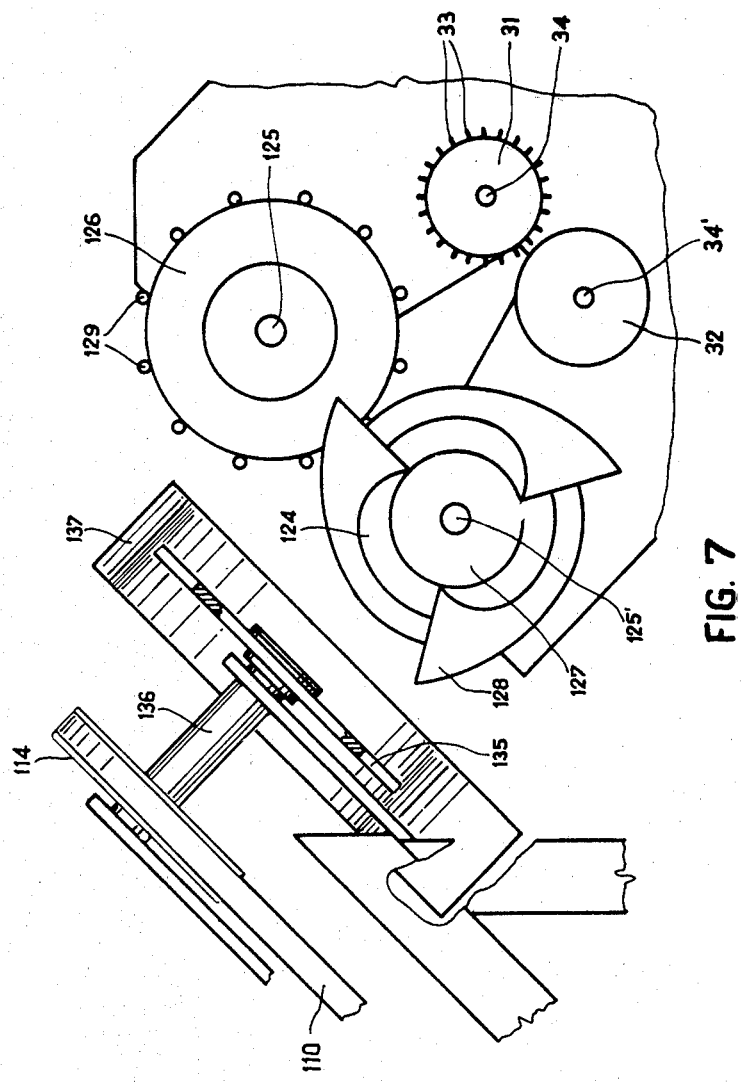
FIG. 7 is a section along D—D of FIG. 6.

The upper end of the conveyor illustrated in FIGS. 6 and 7 comprises a short belt 110 and a longer belt 111 running over loose pulleys 114 and 114' respectively. The belt drives are, in the present case, parallel and not curved as in the previous embodiment. However, in order to direct the plant stalks into the gap between the rollers 121, 122, these are taken off between the two belts by a sprocket wheel 135 mounted on a rotatable shaft 136 and rotated by the pulley 114. The plant stalks are gripped between the teeth of the sprocket wheel and a curved guide sheet 137 which surrounds about one quarter of the sprocket wheel circumference. The outer diameter of the sprocket wheel is larger than that of the pulley, the diameter of the teeth base coinciding approximately with the outer pulley diameter, whereby the stalks are kept at a distance from the pulley. The guide sheet 137 starts parallel with the direction of the belts 110, 111 and ends at a right angle thereto, causing the plant stalks to be delivered into the rollers about perpendicular to the path of the belts.

The embodiment illustrated in FIGS. 5 to 7 has proved itself superior in the delivery of the plant stalks to the rollers than the embodiment of FIGS. 1 and 2, because it avoids the S-shaped bending of the outer belts 11 and their ensuing rapid wear and tear. The sprocket wheel guides the stalks and roots in a positive grip into the gap between the conical ends of the rollers, where they are conveyed by the helical ribs to the roller center and from there into the shredder, aided by the second pair of rollers 31 and 32.

The important feature of the implement is the collection of the extracted roots and stalks and their shredding into small particles, a task not readily carried out by the existing stalk extracting implement, which either leave whole plants on the field or disperse them after they were cut up into pieces of different sizes.

By enclosing the shredder in a casing and sucking its contents through a blower into container means, dust and dirt are almost completely avoided and do not disturb and molest the tractor driver. The comminuted particles fetch a good price on the market, which will soon cover the slightly higher cost of the apparatus.

I claim:

1. A stalk extracting and shredding implement, comprising:
   a frame mounted on wheels,
   means for attaching the frame to a vehicle,
   means for shredding stalks mounted on said frame, said means including a rotary member,
   at least two arms pivotally connected to the top of the frame, said arms extending obliquely downward toward the vehicle, said arms defining a space therebetween above the shredding means,
   at least two parallel shafts rotatably mounted at the lower ends of each arm,
   wheels for extracting stalks from the agricultural land obliquely mounted on said shafts and resilient tires on said wheels having their adjoining surfaces pressed together,
   a belt conveyor on the arms adapted to convey the extracted plants from between the extractor wheels,
   means for driving said parallel shafts,
   a first upper and first lower pulley in spaced relation to one another on the each arm adjacent said space, said first lower pulley being mounted on one of said parallel shafts adjacent said space,
   a first continuous belt tensioned between said first upper and lower pulleys,
   a second upper and second lower pulley in spaced relation to each other on each arm, said second lower pulley being mounted on the other of said parallel shafts remote from said space, said second upper pulley being substantially coplanar in line with and above said first upper pulley adjacent said space,
   a second continuous belt tensioned between said second upper and second lower pulley, said first and second belts having portions moving up said arm biased against one another, whereby said first and second belts convey the extracted stalks to said space,
   an upper pair of feed rollers positioned in said space between the shredder and the top of said arm, and
   a lower pair of rollers positioned below said upper feed rollers and opposite the shredder, said upper pair and lower pair of rollers being adapted to rotate thereby conveying the extracted stalks from the belt conveyor into the shredder.

2. The stalk extracting and shredding implement of claim 1, wherein:
   (a) said second upper and lower pulleys are aligned with one another, are substantially parallel to said first upper and lower pulleys and are remote from said space;
   (b) a sprocket means coaxially rotatable with said first upper pulley is provided, said sprocket means having an outer diameter larger than said first upper pulley; and
   (c) at least one curved guide sheet surrounds a portion of said sprocket means, said guide sheets being adapted to guide said stalks toward said space;
   (d) a rotary shredder is mounted below said arms, said shredder being substantially surrounded by a casing, said casing having an inlet opening and an outlet opening therein;
   (e) an upper pair of feed rollers is positioned in said space between said shredder and the top of said arm, the first of said upper feed rollers having centrally located lengthwise rows of radially protruding spiked means thereon and the second of said upper rollers provided with extended lengthwise ridges in the central portion thereof;
   (f) a lower pair of rollers is positioned below said upper feed rollers and adjacent said inlet opening in said shredder casing, said upper and lower pairs of rollers adapted to rotate in a manner to convey said stalks from said conveyor to said shredder.

3. The stalk extracting and shredding implement of claim 2, comprising a means for blowing shredded stalks from said shredding means.

4. The stalk extracting and shredding implement of claim 3, wherein said blowing means is connected to said casing at the outlet thereof.

5. The stalk extracting and shredding implement of claim 1, wherein the first of said feed rollers has lengthwise rows of radially protruding means on the central portion thereof and helical ribs on the end portion thereof and wherein the second of said upper rollers has extended lengthwise ridges in the central portion thereof.

6. The implement of claim 1 or 2, wherein said rotary shredder comprises a horizontal, fast-rotating shaft, provided with a plurality of pivoted arms, each arm being provided with a cutter, allsaid cutters describing a cylindrical surface during their rotation.

7. The implement of claim 6, wherein a stationary cutter blade is provided across said opening in said shredder casing, just outside of the cylindrical surface described by said rotating cutters.

8. The implement of claim 1 or 2, wherein the upper pulleys of the two belt conveyors are so positioned on said pivoted arms that the outlets between said belts between said upper pulleys are positioned above the ends of said upper pair of said superposed feed rollers.

* * * * *